United States Patent
Stephenson et al.

(10) Patent No.: US 7,499,718 B2
(45) Date of Patent: Mar. 3, 2009

(54) ENHANCED COVERAGE HOLE DETECTION IN WIRELESS NETWORKS

(75) Inventors: David Sheldon Stephenson, San Jose, CA (US); Timothy S. Olson, San Jose, CA (US); Bretton Lee Douglas, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 315 days.

(21) Appl. No.: 11/496,946

(22) Filed: Aug. 1, 2006

(65) Prior Publication Data

US 2008/0032727 A1 Feb. 7, 2008

(51) Int. Cl.
H04B 7/00 (2006.01)
H04B 17/00 (2006.01)
H04Q 7/20 (2006.01)

(52) U.S. Cl. .............. 455/513; 455/423; 455/67.11
(58) Field of Classification Search .......... 455/513, 455/423, 67.11
See application file for complete search history.

(56) References Cited

U.S. PATENT DOCUMENTS

| | | | |
|---|---|---|---|
| 5,491,692 A | 2/1996 | Gunner et al. | |
| 5,684,860 A | 11/1997 | Milani et al. | |
| 5,940,384 A | 8/1999 | Carney et al. | |
| 6,097,956 A | 8/2000 | Veeravalli et al. | |
| 6,104,928 A | 8/2000 | Waugh | |
| 6,140,964 A | 10/2000 | Sugiura et al. | |
| 6,167,274 A | 12/2000 | Smith | |
| 6,208,629 B1 | 3/2001 | Jaszewski et al. | |
| 6,223,028 B1 | 4/2001 | Chang et al. | |
| 6,240,077 B1 | 5/2001 | Vuong et al. | |
| 6,243,413 B1 | 6/2001 | Beukema | |
| 6,286,038 B1 | 9/2001 | Reichmeyer et al. | |
| 6,338,140 B1 | 1/2002 | Owens et al. | |
| 6,473,038 B2 | 10/2002 | Patwari et al. | |
| 6,664,925 B1 | 12/2003 | Moore et al. | |
| 6,754,488 B1 | 6/2004 | Won et al. | |
| 6,760,318 B1 | 7/2004 | Bims | |
| 6,788,658 B1 | 9/2004 | Bims | |
| 6,799,047 B1 | 9/2004 | Bahl et al. | |
| 6,810,428 B1 | 10/2004 | Larsen et al. | |
| 6,917,819 B2 | 7/2005 | Collins | |
| 6,925,069 B2 | 8/2005 | Koos et al. | |
| 6,925,070 B2 | 8/2005 | Proctor, Jr. | |
| 6,990,428 B1 | 1/2006 | Kaiser et al. | |
| 7,068,644 B1 | 6/2006 | McConnell et al. | |
| 7,133,909 B2 | 11/2006 | Bahl | |
| 7,301,926 B1 | 11/2007 | Dietrich et al. | |
| 2002/0168958 A1 | 11/2002 | Ford et al. | |

(Continued)

OTHER PUBLICATIONS

U.S. Appl. No. 10/407,357, filed Apr. 4, 2003, Dietrich, et al.

(Continued)

*Primary Examiner*—Barry W Taylor
(74) *Attorney, Agent, or Firm*—Baker Botts L.L.P.

(57) ABSTRACT

Methods, apparatuses and systems directed to identifying coverage holes in wireless networks. According to one implementation of the present invention, the wireless network infrastructure analyzes signal strength data to detect potential coverage holes associated with one or more wireless clients and validates the potential coverage holes based on observed coverage data.

23 Claims, 8 Drawing Sheets

U.S. PATENT DOCUMENTS

| | | |
|---|---|---|
| 2002/0188723 A1 | 12/2002 | Choi et al. |
| 2002/0194384 A1 | 12/2002 | Habetha |
| 2003/0023746 A1 | 1/2003 | Loguinov |
| 2003/0117985 A1 | 6/2003 | Fuji et al. |
| 2003/0188006 A1 | 10/2003 | Bard |
| 2003/0198208 A1 | 10/2003 | Koos et al. |
| 2003/0224787 A1 | 12/2003 | Gandolfo |
| 2004/0111607 A1 | 6/2004 | Yallepeddy |
| 2004/0203910 A1 | 10/2004 | Hind et al. |
| 2005/0213579 A1* | 9/2005 | Iyer et al. ............... 370/395.2 |
| 2006/0023650 A1* | 2/2006 | Dominique et al. ......... 370/310 |
| 2006/0075131 A1 | 4/2006 | Douglas et al. |
| 2006/0128371 A1* | 6/2006 | Dillon et al. ............... 455/423 |

OTHER PUBLICATIONS

Funke, Stefan, *Topological Hole Detection in Wireless Sensor Networks and its Applications*, Computer Science Department, Stanford University, Sep. 2, 2005.

International Standard, ISO/IEC 8802-11 ANSI/IEEE std. 802.11, 1999 Edition, Part II: Wireless LAN medium Access Control (MAC) and Physical Layer (PHY) specifications, pp. 122-137.

"tcp-masq" Internet citation http://speed.cis.nctu.edu.tw/bandwith/opensource/. Daa Sheet Cisco Aironet 1200 Series Access Point, pp. 1-13, posted Mar. 11, 2002.

PCT Notification of Transmittal of the International Search Report and the Written Opinion of the International Searching authority or the Declaration (PCT Rule 44.1), dated Sep. 18, 2006, International Application No. PCT/US2006/00078.

Office Action dated Apr. 11, 2007 for U.S. Appl. No. 10/407,357.

* cited by examiner

ENHANCED COVERAGE HOLE DETECTION IN WIRELESS NETWORKS

FIELD OF THE INVENTION

The present invention relates to wireless networks and, more particularly, to methods, apparatuses, and systems directed to identifying radio frequency coverage holes in wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. In Voice over Internet protocol (VoIP) systems and in particular VoIP over WLAN (VoWLAN) systems there are many points in the network that can cause audio impairments to the end users. For example, gaps or "holes" in the radio coverage of a wireless access point are a primary cause of poor audio. The solution is to provide a coverage hole detection feature for the WLAN on an ongoing basis. Unfortunately, existing coverage hole detection implementations suffer from false positive coverage hole alarms. Algorithms in the central wireless controllers may provide some coverage hole detection functions, but such algorithms do not provide features that eliminate false positive reports for coverage hole alarms. A typical system administrator's response to a coverage hole report would be to either increase the transmitter power of one or more of the APs in the WLAN or, if the coverage hole is severe enough, to deploy one or more new APs in the network to fill in the missing coverage. Thus it is important to eliminate false positive coverage hole detections so that a system administrator does not undertake these remedial actions needlessly.

DESCRIPTION OF EXEMPLARY EMBODIMENTS

A. Overview

The present invention provides methods, apparatuses, and systems directed to identifying radio frequency (RF) coverage holes in wireless networks. According to one implementation of the present invention, the wireless network infrastructure analyzes received signal strength data to detect potential coverage holes associated with one or more wireless clients. In one implementation, the wireless network infrastructure processes receive signal strength indicator (RSSI) histograms that contain RSSI data corresponding to signals transmitted by wireless clients to identify potential coverage holes. A wireless client is considered to be in a "pre-alarm condition" if the amount of weak RSSI data associated with the wireless client rises above a threshold. A pre-alarm condition indicates a potential coverage hole that may be validated. As described in more detail below, the wireless network infrastructure validates potential coverage holes based on information obtained from wireless clients. In one implementation, the wireless network infrastructure obtains validating information from beacon reports, where valid beacon reports are utilized to determine whether a given pre-alarm condition represents a false positive or an actual coverage hole. False positives may result, for example, from poor wireless client roaming behavior and areas in which a wireless client happens to be located but are considered as areas that are not intended by the system administrator to have WLAN coverage. In one implementation, the wireless network infrastructure generates a coverage hole detection report to provide to a system administrator.

B. Exemplary Wireless Network System Architecture

B.1. Network Topology

Figure 1A:
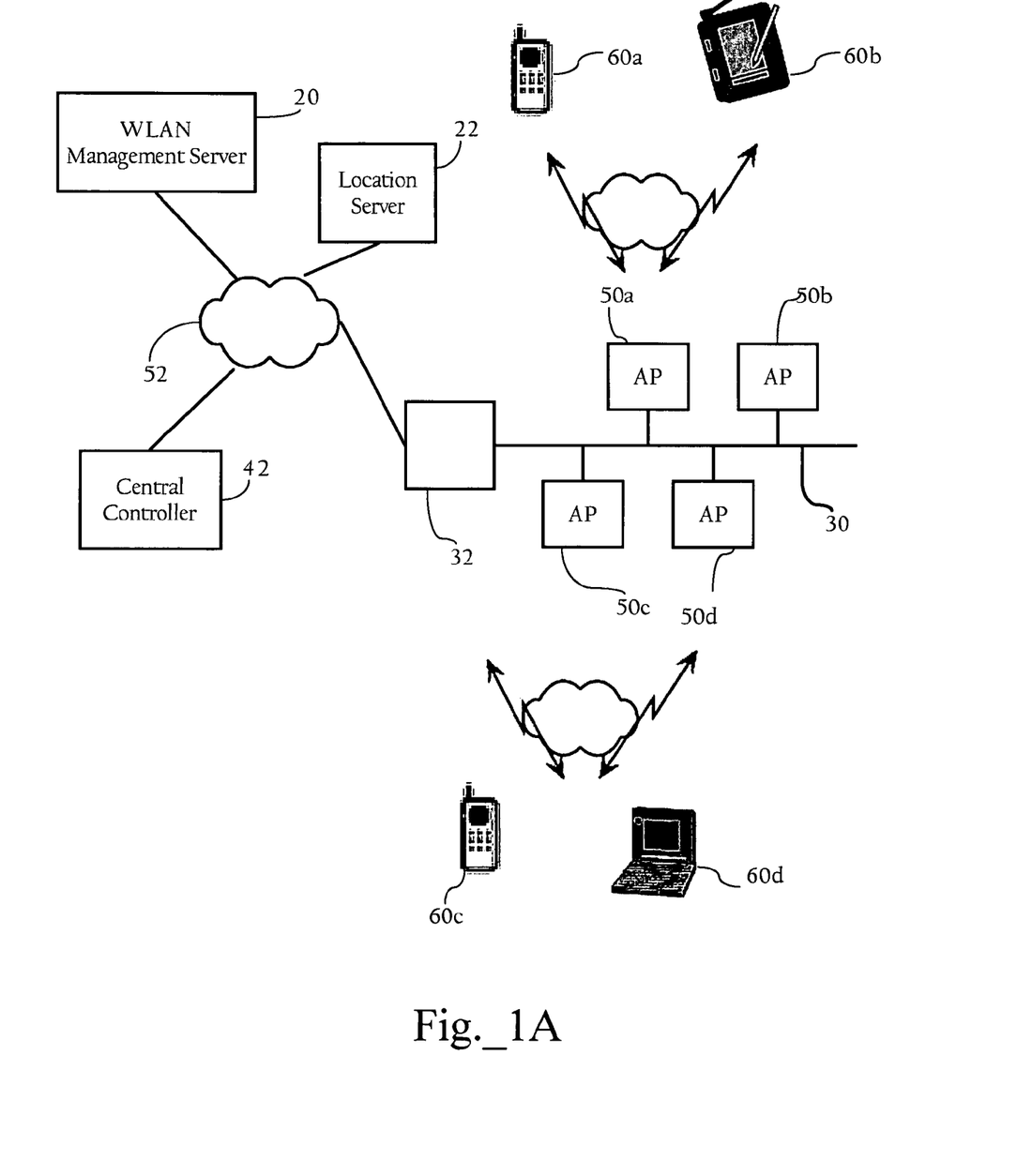
FIG. 1A is a topological diagram of the components in a wireless local area network (WLAN) system according to one implementation of the present invention.

A network environment including a wireless local area network (WLAN) according to one implementation of the present invention is shown in FIG. 1A. In a specific embodiment of the present invention, the system includes a WLAN management server 20, a location server 22, a central controller 42, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

Figure 1B:
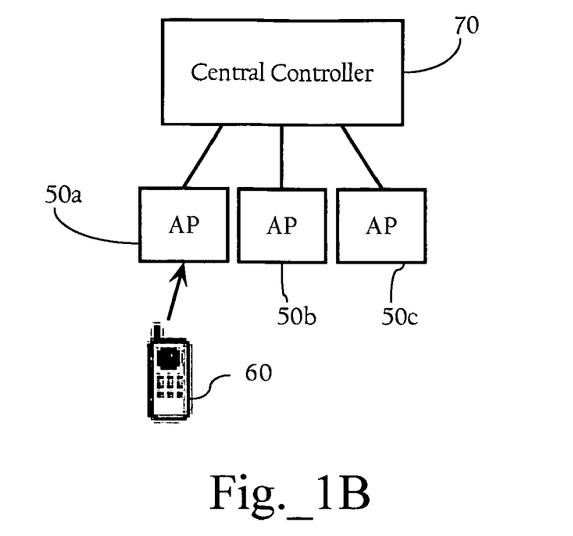
FIG. 1B illustrates a hierarchical wireless network including a central controller, according to one implementation of the present invention.

The wireless access points 50 are operative to wirelessly communicate with remote wireless client devices 60*a*, 60*b*, 60*c*, and 60*d*. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates a hierarchical wireless network including a central controller 70 according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented as a wireless switch, the central controller 70 is operative to communicate with light-weight wireless access points and process wireless protocol and network management information. As FIG. 1B illustrates, a central controller 70 may be directly connected to one or more access points 50. Alternatively, a central controller 43 may be operably connected to one or more access points over a switched and/or routed network environment, as FIG. 1A illustrates.

Figure 1C:
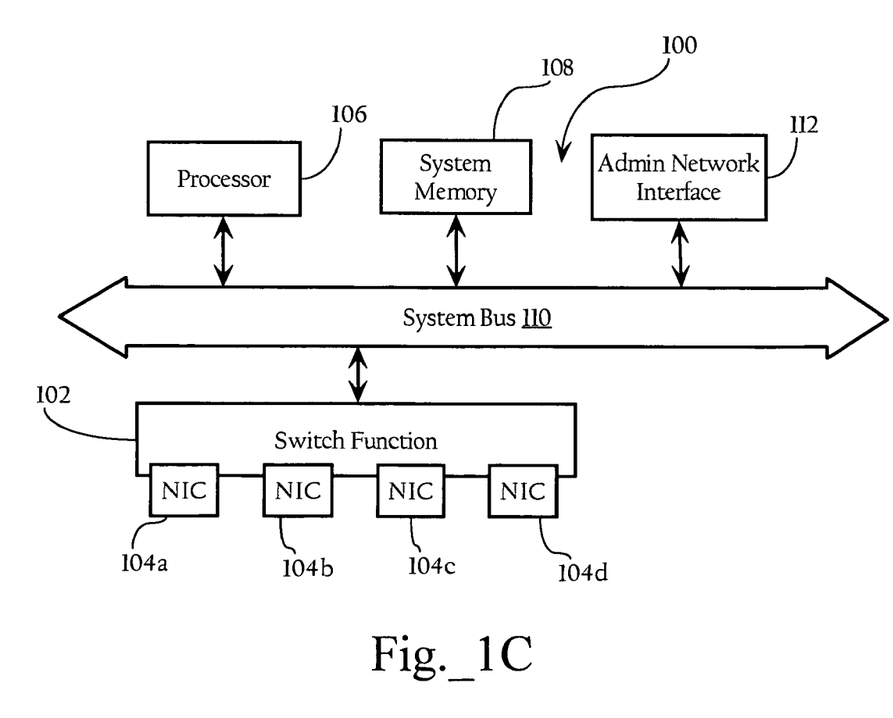
FIG. 1C illustrates for didactic purposes a hardware system, which may be used to implement a central controller.

FIG. 1C illustrates for didactic purposes a hardware system 100, which may be used to implement a central controller 70. As FIG. 1C shows, in one implementation, the central control elements each comprise a switch function or fabric 102 comprising a network interface 104*a* (e.g., an Ethernet adapter) for connection to network 52 and network interfaces 104*b*, 104*c*, and 104*d* for connection to wireless access points. This switch function or fabric is implemented to facilitate connection to the access elements. Central controller 70, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 70 includes a single network interface. The functionality of implementations of the present invention described below in connection with FIGS. 5-7.may reside in each wireless access point if the access points are autonomous wireless access points, or alternatively may be distributed between the wireless access points 50 and central controller 42.

B.3. WLAN Management Server

Figure 2:
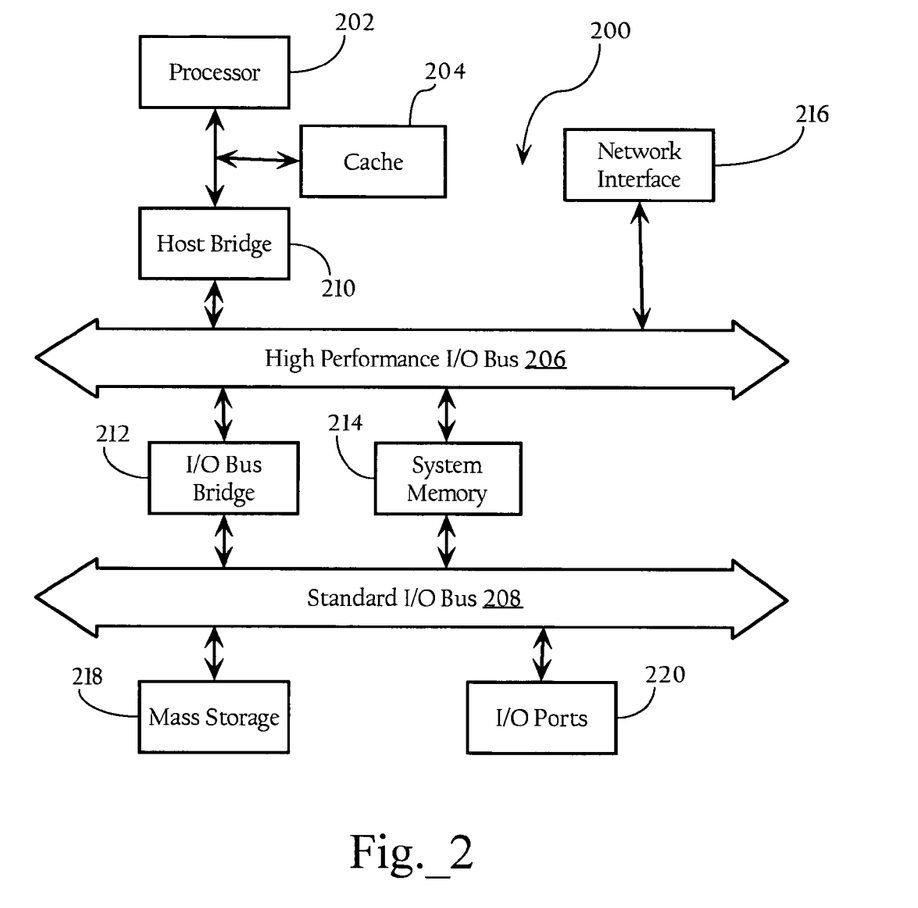
FIG. 2 illustrates for didactic purposes a hardware system, which may be used to implement a WLAN management server.

FIG. 2 illustrates for didactic purposes a hardware system 200, which may be used to implement a WLAN management server 20. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the WLAN management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.4. Wireless Access Point

Figure 3:
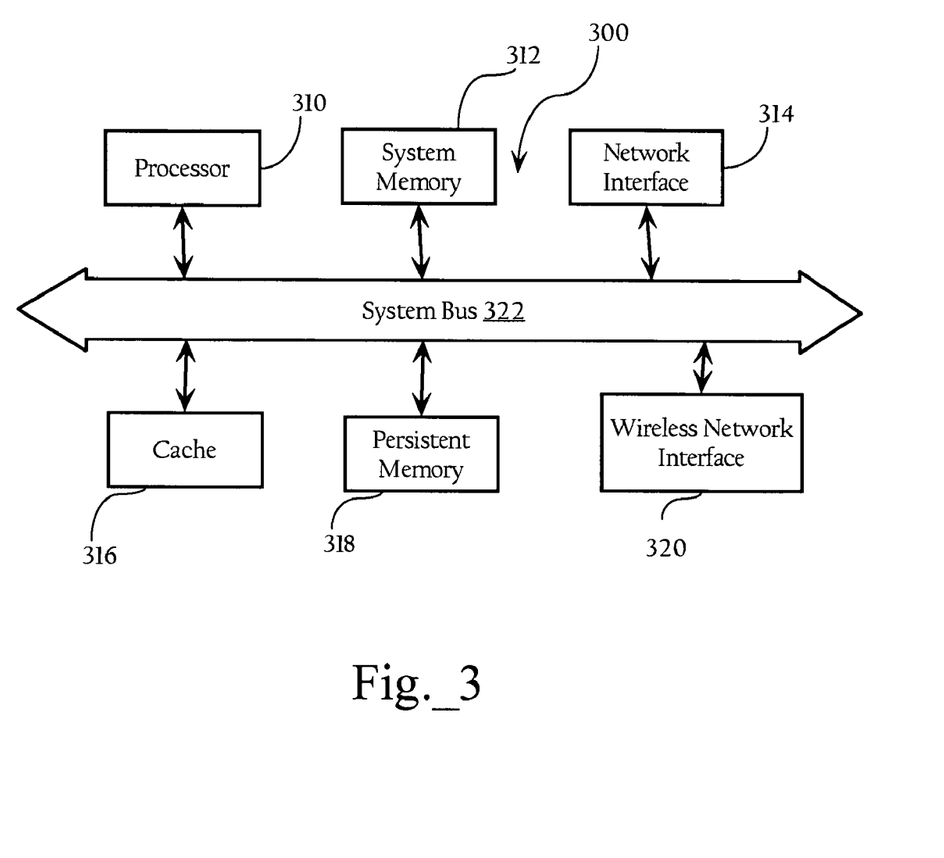
FIG. 3 illustrates for didactic purposes a hardware system, which may be used to implement a wireless access point.

FIG. 3 illustrates for didactic purposes a hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device-drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

B.5. Wireless Client

Figure 4:
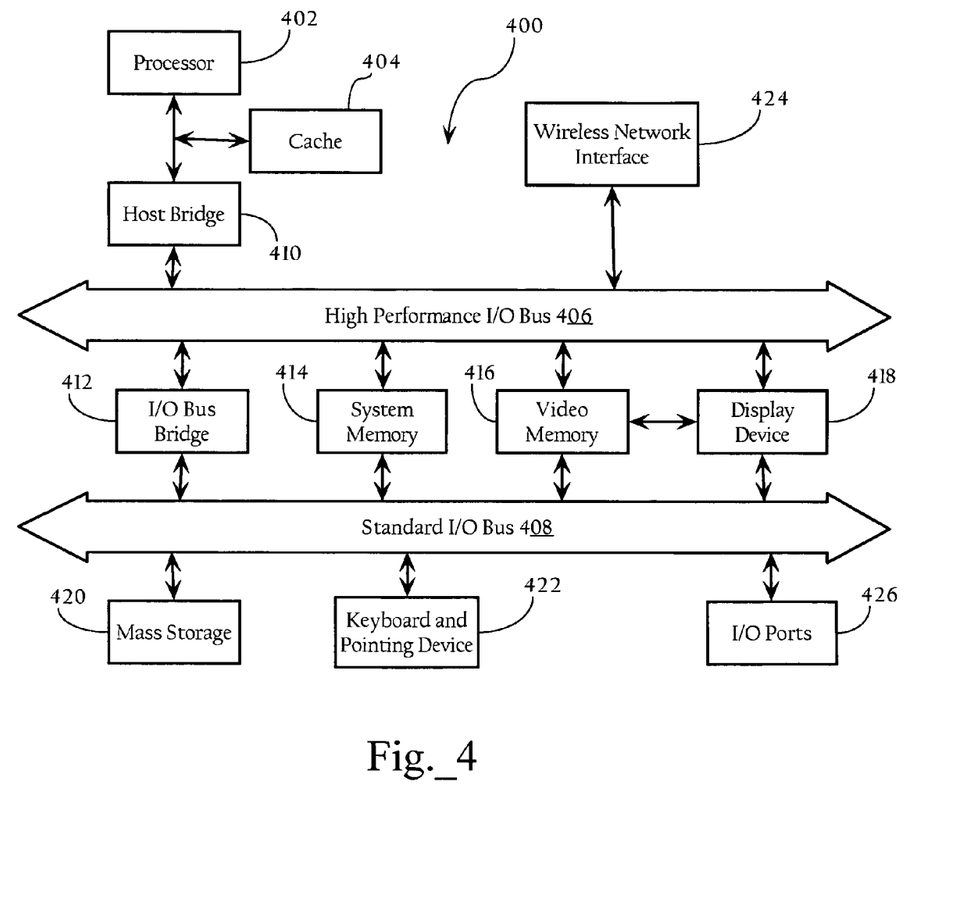
FIG. 4 illustrates for didactic purposes a hardware system, which may be used to implement a wireless client.

FIG. 4 illustrates for didactic purposes a hardware system 400, which may be used to implement a wireless client 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 4 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Coverage Hole Detection and Validation

The following describes processes directed to the detection of potential coverage holes and verification of the potential coverage holes to determine whether they are false positives or actual coverage holes.

C.1. Potential Coverage Hole Detection

Figures 5A, 5B:
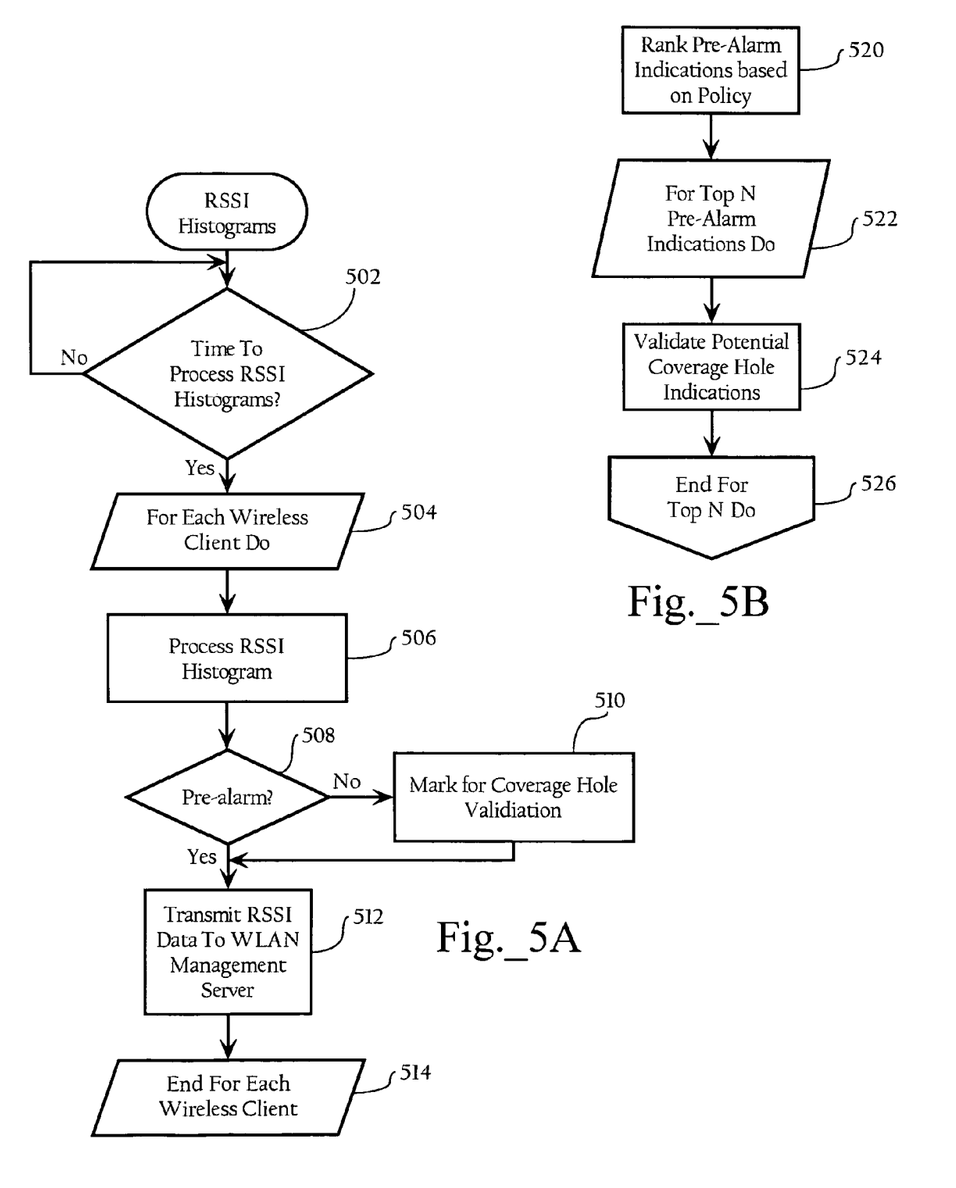
FIG. 5A is a flow chart illustrating a process flow for detecting potential coverage holes, according to one implementation of the present invention.
FIG. 5B is a flow chart illustrating a process flow for processing potential coverage hole indications, according to one implementation of the present invention.

FIG. 5A is a flow chart illustrating a process flow for detecting potential coverage holes, according to one implementation of the present invention, implemented at a wireless access point 50. In a separate process, the wireless network infrastructure (e.g., wireless access point 50 and/or central controller 42) maintains RSSI histograms for each associated wireless client 60. The data in the RSSI histograms corresponds to the received signal strength indicators (as detected by respective access points) associated with frames transmitted by wireless clients 60. In one implementation, wireless access point 50 periodically (e.g., every 5 seconds) (502), for each wireless client (504) processes the RSSI histograms (506) corresponding to associated wireless clients to detect potential coverage holes and transmit the RSSI histograms to an upstream node (such as a WLAN management server 20, a central controller 42, and the like).

It is to be understood that other metrics besides RSSI may be used for detecting coverage holes. These metrics include signal-to-noise ratio (SNR), signal-to-interference ratio (SIR), and signal-to-noise-plus-interference ratio (SINR). All these metrics may be used to indicate that a receiver receiving transmissions below a certain threshold value will suffer impaired performance and that a system administrator will need to take correction action to remedy the situation. For the case of RSSI and SNR metrics, this remedy will typically take the form of increasing signal strength. For SIR or SINR metrics, this remedy could take the form of increasing signal strength or reducing co-channel (or adjacent channel) interference.

Wireless access point 50 may collect RSSI data for each transmission stream corresponding to all wireless access types, or only for one or more predetermined access classes, such as active voice or video traffic. In one implementation, wireless access point 50 records RSSI data of the received packets in an RSSI histogram, which may range from –90 dBm to –60 dBm in 1-dB steps. Note that these are simply default values for minimum, maximum, and bin size, respectively, and the actual values may vary, depending on the specific implementation. Packets with an RSSI greater than –60 dBm may be accumulated in a –60 dBm bin; and packets with an RSSI less than –90 dBm may be accumulated in a –90 dBm bin.

Next, wireless access point 50 determines whether a pre-alarm condition exists (508). In one implementation, the term "pre-alarm" is a "preliminary" designation, as distinguished from an actual coverage-hole alarm, where wireless access point 50 may determine both the pre-alarm and actual coverage-hole alarm conditions as described below. WLAN management server 20 may provide wireless access point 50 with coverage hole detection (CHD) parameters. In one implementation, wireless clients enter a pre-alarm condition when the number of packets received at or below a RSSI threshold in a single CHD measurement interval is above a threshold count. In one implementation, 802.11 MAC data frames are used as valid packets (i.e., 802.11 control and management frames are excluded). This is important since all wireless clients use 802.11 management frames; and sorting pre-alarm wireless clients would not cause voice clients to be reported ahead of data clients when the number of pre-alarms exceeds 5 (a default number of wireless client pre-alarms to report). In one embodiment, each time wireless access point 50 detects a pre-alarm condition, wireless access point 50 increments a pre-alarm counter, which is reported to the a system administrator via a coverage hole detection report (described below). Other parameters and thresholds can be used to determine a "pre-alarm" condition, such as comparing the number of samples below an RSSI threshold to the total number of samples, etc.

Next, if wireless access point 50 detects a pre-alarm condition, wireless access point 50 marks the RSSI histogram for coverage hole validation (510). Next, wireless access point 50 transmits the RSSI data to the WLAN management system 20 (512) and the process ends (514). In one implementation, before transmitting the RSSI data to WLAN management server 20, wireless access point 50 aggregates the RSSI histograms (e.g., generated at 5-second intervals) into a single CHD report (e.g., generated every 90-seconds), which wireless access point 50 may transmit to WLAN management module 20. In one implementation, the CHD report may be a cumulative RSSI histogram that is the sum of the collected RSSI histograms. Wireless access point 50 may generate a cumulative RSSI histogram for each wireless client. If wireless access point 50 detects a pre-alarm condition, the wireless access point 50 first marks the RSSI data for further analysis (512).

C.2. Top 5 Wireless Clients Identified

FIG. 5B is a flow chart illustrating a process flow for processing potential coverage hole indications, according to one implementation of the present invention. In one implementation, to reduce processing requirements associated with validation of potential coverage holes, wireless access point 50 identifies the top N (e.g., N equals 5) wireless clients associated with pre-alarm conditions. In one implementation, wireless access point 50 ranks pre-alarm indications based on one or more policies (520). This determination may be based on several factors, such as the relative priority of the wireless traffic transmitted by the corresponding wireless clients, the relative priorities of the wireless clients themselves (as determined by one or more policies), and the like. For example, the determination may be based on the user priority of wireless traffic that a wireless client transmits during a 5-second or 90-second interval (e.g., the highest Wireless Multimedia (We) user priority) and then may also be based on the degree to which the RSSI histogram data exceeds the pre-alarm threshold. For ordering based on user priority, the higher the user priority value, the higher the precedence. The rationale for ordering by user priority is that wireless clients using the voice user priority (UP=6; the highest UP=7 which is typically reserved for network control traffic) will typically be transporting voice, where coverage holes may impact audio quality more severely than they would impact best-effort data services.

When ordering by user priority, it does not matter how many packets are received in the corresponding user priority, as long as the wireless client is in the pre-alarm condition based upon the user priority of all the packets received during the CHD measurement interval. The following are some examples covered by implementations of the present invention. For example, a voice handset may be just beginning or ending a call and thus may have attempted to transmit only a small number of packets while in the coverage hole. In another example, a voice handset which is on-hook and in a coverage hole may be transmitting signaling packets (e.g., using user priority (UP)=4). If the voice handset is in a coverage hole when the voice handset attempts to transmit the signaling packet, it will be distinguished from a data-only client.

When ordering by user priority, the wireless access point may apply any defined rules (e.g., Modular Quality of Service Command-Line Interface (MQC) for packet classification. This is especially important for CHD on legacy wireless clients. Because legacy wireless clients do not transmit an 802.11 Quality of Server (QoS) Media Access Control (AC) header, a wireless access point would not know the packet priority until after classification.

C.3. Maximum Histogram

As described above, in one implementation, wireless access point 50 may aggregate RSSI histograms (e.g., generated at 5-second intervals) into a single CHD report (e.g., generated every 90-seconds), which wireless access point 50 may transmit to WLAN management module 20. In one implementation, the CHD report may be a maximum RSSI Histogram, which is calculated for each wireless client in a pre-alarm condition. The maximum histogram provides a worst-case coverage for a given wireless client. To form a maximum RSSI histogram, for each 5-second measurement interval, wireless access point 50 counts the number of packets received with an RSSI less than the threshold RSSI. If the count of these packets is greater than the count for the previous 5-second interval, the maximum RSSI histogram is updated by replacing its existing contents with the contents of the RSSI histogram for the current 5-second interval. This process continues over the remaining 5-second measurement intervals in a given 90-second interval. At the beginning of the 90-second interval, the maximum RSSI histogram is cleared so that the maximum computation does not span more than one 90-second reporting period.

In one implementation, wireless access point 50 saves the maximum histogram for each wireless client that has been determined to be one of the top N. Accordingly, the RSSI data may be reported to WLAN management server 20 every 90 seconds in order to reduce the amount of data that is sent to WLAN management server 20. This is important for the scalability of the WLAN management server 20 in that there will be few CHD alarms in a well deployed network. Referring again to FIG. 5B, for the top N pre-alarm indications (522), wireless access point 50 or other suitable wireless network node (e.g., central controller 42 and/or WLAN management server 20) validates potential coverage hole indications (524) and the process ends (526).

D. Validation of Coverage Hole Detection

Figure 6:
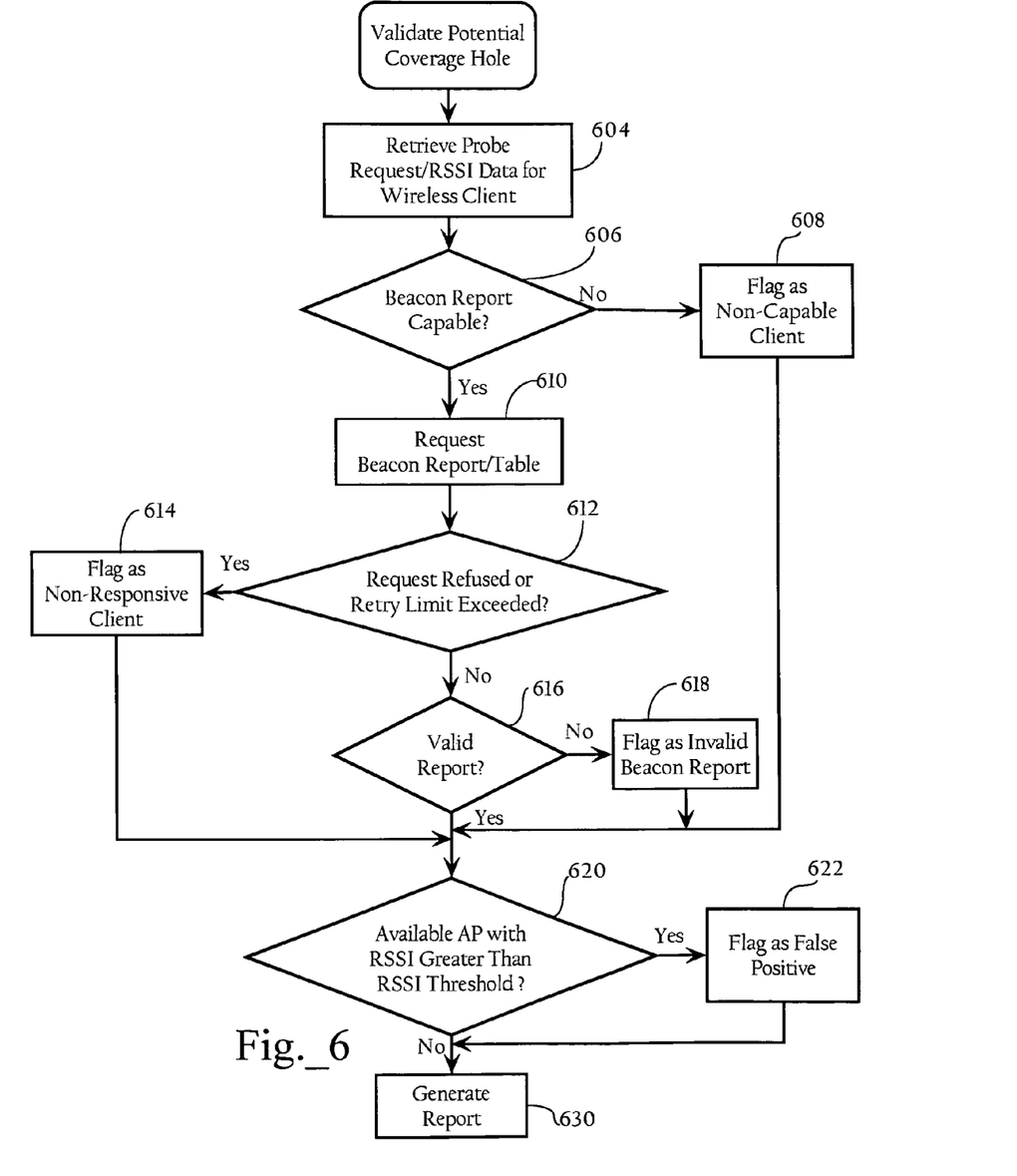
FIG. 6 is a flow chart illustrating a process flow for verifying coverage holes, according to one implementation of the present invention, implemented at a wireless access point.

FIG. 6 is a flow chart illustrating a process flow for verifying coverage holes, according to one implementation of the present invention. As discussed above, the coverage hole validation process may be executed entirely at an access point 50, or may be implemented at a central controller 42, a WLAN management server, or other node, or any combination thereof. As FIG. 6 illustrates, the coverage hole validation process retrieves a RSSI data corresponding to a client's Probe Request or RSSI data from wireless client 60 (604). Next, the coverage hole validation process determines whether wireless client 60 is capable of providing an active beacon report or beacon table (e.g., CCXv2 capable) (606). If not, the coverage hole validation process flags wireless client 60 as a non-capable client (608) and skips to step 620 described below. If wireless client 60 is capable of providing an active beacon report, the coverage hole validation process requests an active beacon report from wireless client 60 (610). A beacon report contains identifiers for the wireless access points that the wireless client discovers during active and/or passive scans. In one implementation, a beacon report may include MAC addresses of the wireless access points 50 and RSSI data associated with the beacon frames that wireless clients 60 discovered during a passive scan of one to all RF frequency channels. If active scans are employed, then the client also saves the RSSI data corresponding to received Probe Responses. In addition, the AP's coverage hole validation process may also obtain the RSSI data associated with the Probe Requests transmitted by the wireless client (as detected by neighboring access points) corresponding to the active scan being carried out. In one implementation, only the wireless access point that issued the request for the active beacon report needs to save the probe request data. If the active beacon report request is refused or if the retry limit is exceeded (612), the coverage hole validation process flags wireless client 60 as a non-responsive client (614). In one implementation, the coverage hole validation process may request the information maintained in a beacon table of the wireless client 60. In one implementation, a wireless client maintains the MAC addresses and recent RSSI data for access points for which the wireless client detects beacon frames. Instead of actively generating a beacon report, the beacon table information can be used, if available. If the beacon table is refused or if the retry limit is exceeded, the coverage hole validation process flags wireless client 60 as a non-responsive client.

In one implementation, the coverage hold validation process may utilize the RSSI measurements from the Probe Requests in place of the beacon report for the same purposes and in the same manner; in this case, all APs receiving Probe Requests from said client must save the corresponding RSSI. Note, however, that some wireless clients may employ passive scanning and therefore may not transmit a sufficient number of probe requests to be useful for this purpose.

D.1. Coverage Hole Validation

Generally, validation of potential coverage holes is based on a determination of whether another wireless access point is available to the wireless client with a sufficient signal strength. In one implementation, this is determined at least in part by the beacon report or table provided by the wireless client to determine what access point(s) the wireless client detects and at what signal strength. In one implementation, since the accuracy with which a given wireless client can make RSSI measurements is relevant, the beacon report or table information is validated. The following describes determining whether the beacon report or beacon table is reliable/valid in order to verify whether any potential coverage holes are false positive or actual coverage holes. Referring again to FIG. 6, if the coverage hold validation process receives a beacon report or table, the coverage hole validation process validates the beacon report or table (616). The beacon report may be verified in a number of ways. A goal is to determine whether the receive signal strength calibration of a given wireless client is good or poor. If the beacon report is good, the beacon report may be classified as valid or wireless client 60 may be classified as having a roaming problem. In one implementation, if it is poor, then the beacon report is not used in validating the potential coverage hole.

In one implementation, a method for validating the beacon report is to compare the RSSI values that wireless client 60 measures to the corresponding RSSI values that wireless access point 50 measures. In one implementation, the upstream and downstream RSSI values between the wireless clients and respective access points are compared. If they are sufficiently close, the beacon report measurements are deemed reliable. In one implementation, wireless client 60 transmits a probe request and only the wireless access point 50 to which wireless client 60 is associated saves the Timing Synchronization Function (TSF) time and RSSI for each probe request received from the wireless client. Using the set of saved probe request data, the coverage hole validation process first finds the TSF time of the probe request data which is closest to that of the TSF time embedded in the beacon report. If the TSF times are close (say within 10 seconds or so—this is a configurable parameter in the CHD algorithm) indicating the client has not moved its position significantly relative to the measuring APs in the time between the upstream and downstream measurements, then the next step is taken. If not, the second method, described below, is used. Using the probe request data having the closest TSF time to the beacon report data, the following calculations are performed:

Pathloss (upstream)=Client Transmit Power limit−
  RSSI (Probe Request)

Pathloss (downstream)=*AP* Transmit Power−*RSSI*
  (Beacon Report(*AP*))

Pathloss (difference)=|Pathloss (upstream)−Pathloss
  (downstream)|

With regard to the RSSI (Beacon Report AP), any given beacon report may contain measurements from zero of more wireless access points. For the downstream pathloss measurement, the value for the same wireless access point as used in the wireless access point Transmit Power may be used. If the Pathloss (difference) is less than 6 dB (or suitable, configurable small value), the beacon report is deemed reliable. In one implementation, if multiple beacon reports are received and are sufficiently close in time to probe requests, the multiple pathloss. (difference) values are arithmetically averaged for better accuracy (and to account for multipath fading).

Another method for determining the validity of the beacon report is by direct observation of reported RSSIs of observed beacons. If wireless client 60 really is in a coverage hole, it should only detect one or two beacon frames corresponding to one or two access points, where measurements from both would be below the RSSI threshold. If a wireless client measures a larger number of beacons where all are below the RSSI threshold, the wireless client measurements may be deemed invalid. Referring again to FIG. 6, if the report is not valid, the coverage hole validation process flags the pre-alarm as having an invalid beacon report (618).

Next, if the beacon report is valid, the coverage hold validation process determines whether there is an available wireless access point with an RSSI greater than the RSSI of the current wireless access point to which wireless client is associated and this RSSI is higher in dBm than a RSSI Threshold (620). As discussed above, this can be accomplished based on validated beacon reports of wireless clients and/or the RSSI data. If a wireless access point having a higher RSSI is available, the coverage hole validation process flags the pre-alarm as a false positive or a roaming bug (622). The pre-alarm is deemed to be a false positive in this scenario, because wireless client 60 may not be associated to the best wireless access point (i.e., best from an RSSI perspective). This would be the case if wireless client 60 has not properly roamed and remains associated to a more distant wireless access point. In this case, wireless client 60 is deemed to have a roaming bug. In this situation, wireless client 60 is not in a coverage hole but is instead associated to a suboptimal wireless access point. In one implementation, if wireless client 60 is determined to have a probable roaming bug, then the CDH report would be marked as a false positive. If the beacon report is present and calculated to be invalid, its status would be that there is a probable coverage hole which is not locatable. Making this determination is important for two reasons. The first reason is that it lets the system administrator know that the issue is with the roaming implementation of wireless client 60 and not the WLAN Infrastructure or its deployment. The second reason is that the determination prevents a false positive report of a coverage hole; that is, the area in which wireless client 60 is located actually has sufficient coverage from another wireless access point, but wireless client 60 is not associated to that wireless access point.

Next, the coverage hole validation process generates a report (630), which the coverage hole validation process, in one implementation, may make available to or send to the system administrator. In one implementation, a CHD report provides a graphical representation of any actual coverage holes as well as other information such as pre-alarm counts and false positives, all of which facilitate the system administrator in network management decisions. In one implementation, if a beacon report was not present, the report may indicate that a determination of a roaming bug or an estimated wireless client location was not possible. In one implementation, if a beacon report was present but was not reliable, the report may indicate a probable coverage hole and/or that a estimated wireless client location was not possible. In one implementation, if a reliable beacon report was present and no roaming bug was detected, the report may indicate a probable coverage hole and an estimated wireless client location. In these scenarios, the report may also indicate coverage hole detection fault levels (e.g., red, yellow, green, etc.) for each wireless client. In one implementation, if a reliable beacon report was present and a roaming bug was detected, the report may indicate the roaming bug.

Figure 7:
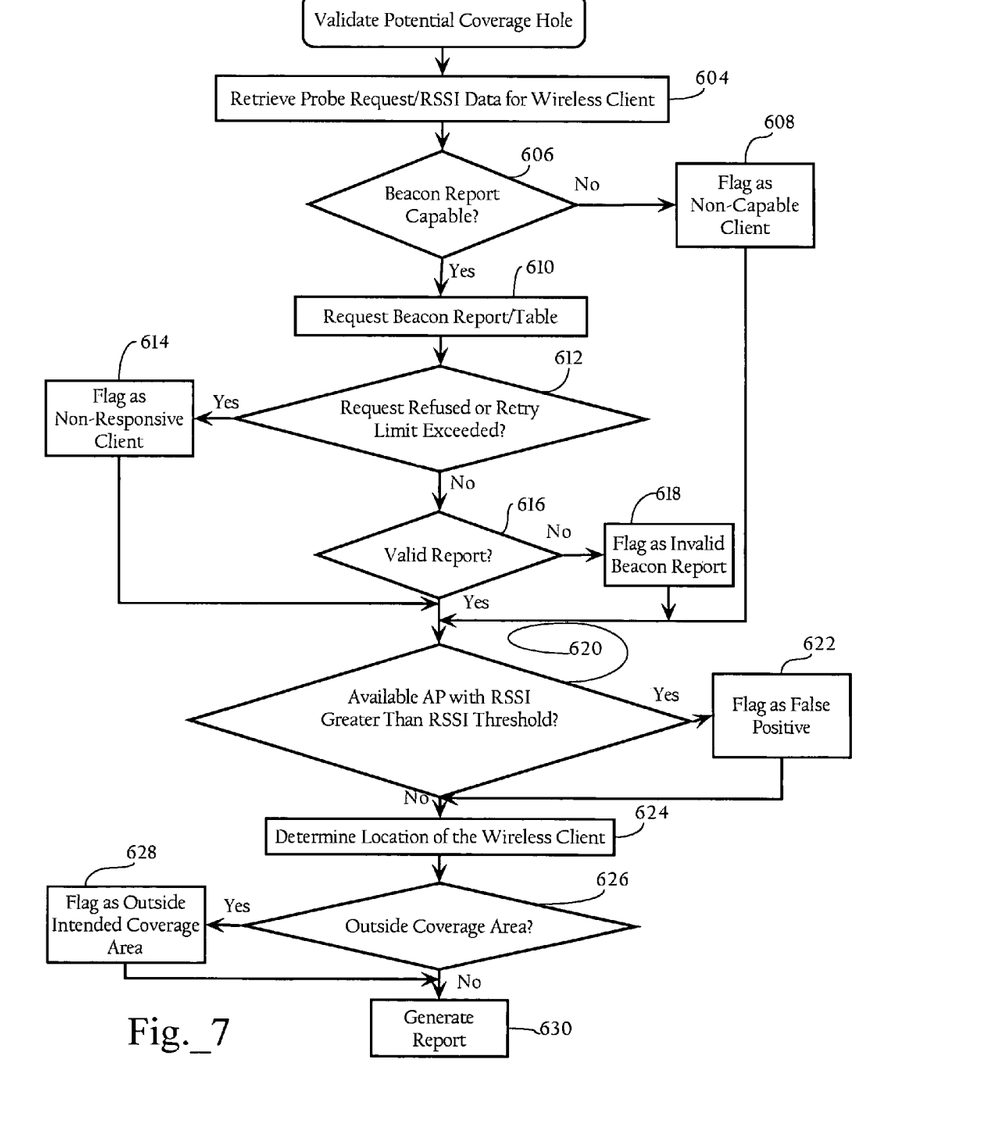
FIG. 7 is a flow chart illustrating a process flow for verifying coverage holes, according to another implementation of the present invention.

FIG. 7 is a flow chart illustrating a process flow for verifying coverage holes, according to another implementation of the present invention. The process flow of FIG. 7 is similar to that of FIG. 6 except that after the coverage hole validation process determines if a wireless access point having an RSSI greater than the RSSI threshold is available, the coverage hole validation process (or central controller 42) may also determine the location of the wireless client (624). In one implementation, the coverage hole validation process computes the location of wire client 60 using the retrieved RSSI data in the beacon report. Alternatively, location server 30 may compute the location of wireless client 60 and then transmit the location to the wireless network node (e.g., WLAN management server 20) performing the coverage hole validation process. Next, the coverage hole validation process determines if wireless client 60 is outside the intended coverage area (626). If wireless client 60 is located outside of the building where proper coverage has not been provided, the pre-alarm may be a false positive. Accordingly, if wireless client 60 is outside the intended coverage area, the coverage hole validation process flags wireless client 60 as being outside the intended coverage area (628). If wireless client 60 is in an area of the building that is supposed to have WLAN coverage, the pre-alarm may indicate a valid coverage hole. In one implementation, if the coverage hole validation process determines that wireless client 60 is a CCXv4 wireless client, the coverage hole validation process may request a schedule of pathloss measurements (which are similar to Probe Requests, but are enhanced in such a manner as to facilitate improved pathloss estimation accuracy) so that the coverage hole validation process or the central controller 42 may more accurately locate the potential coverage hole. Accordingly, when the report is generated (630), it would include any relevant information regarding the location of wireless client.

In the implementations described above, a wireless access point 50 (optionally in combination with central controller 42) may procure the beacon report/table data from a wireless client 60, including setting flags as appropriate during interaction with the wireless client. The beacon report and the flags may then be passed to WLAN management server 20, which can process the retrieved data to validate the coverage hole. As indicated above, however, any suitable wireless network node such as a wireless access point 50, central controller 42, WLAN management server 20, or any-combination thereof, may perform the coverage hole validation process.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A computer readable storage medium encoded with computer executable instructions for identifying coverage holes in a wireless network, the computer executable instructions are operable to:

analyze signal strength data associated with a wireless client; and if the signal strength data indicates that communication quality with the wireless client falls below a first threshold, then request a beacon report from the wireless client, wherein the beacon report includes one or more wireless access points discovered by the wireless client;

validate the beacon report by comparing a upstream Received Signal Strength Indicator (RSSI) value and a downstream RSSI value between the wireless client and a wireless access point associated with the wireless client when a time difference between obtaining the upstream RSSI value and the downstream RSSI value is less than or equal to a second threshold; and if a difference between the upstream RSSI value and the downstream RSSI value is less than or equal to a third threshold, then determine whether the wireless client is in a coverage hole based on the beacon report.

2. The computer readable storage medium of claim 1 wherein the signal strength data is a RSSI histogram for the wireless client that corresponds to RSSI values obtained from the wireless client over a period of time.

3. The computer readable storage medium of claim 2 wherein the the signal strength data is a maximum RSSI histogram for the wireless client that corresponds to RSSI values obtained from the wireless client during a worst sub-period over the period of time.

4. The computer readable storage medium of claim 1 wherein the beacon report further includes a first time stamp.

5. The computer readable storage medium of claim 4 wherein the computer executable instructions are further operable to determine the time difference between obtaining the upstream RSSI value and the downstream RSSI value.

6. The computer readable storage medium of claim 5 wherein, to determine the time difference between obtaining the upstream RSSI value and the downstream RSSI value, the computer executable instructions are further operable to compare the first time stamp included in the beacon report with a second time stamp provided by the wireless access point associated with the wireless client, wherein the second time stamp indicates a time that the wireless access point receives a probe request in connection with the beacon report from the wireless client.

7. The computer readable storage medium of claim 6 wherein the beacon report improves accuracy in locating the one or more potential coverage holes.

8. The computer readable storage medium of claim 1 wherein the wireless client is in a coverage hole if the beacon report indicates that there is no wireless access point with a sufficient signal strength available to the wireless client.

9. The computer readable storage medium of claim 1 wherein the signal strength data comprises one or more of signal-to-noise ratio, signal-to-interference ratio, and signal-to-noise-plus-interference ratio.

10. The computer readable storage medium of claim 1 wherein the computer executable instructions are further operable to determine whether the overage hole is a false positive.

11. The computer readable storage medium of claim 1 wherein the computer executable instructions are further operable to locate multiple coverage holes for the wireless client.

12. A method for identifying coverage holes in a wireless network, the method comprising:

analyzing signal strength data associated with a wireless client; and if the signal strength data indicates that communication quality with the wireless client falls below a first threshold, then requesting a beacon report from the wireless client, wherein the beacon report includes one or more wireless access points discovered by the wireless client;

validating the beacon report by comparing a upstream Received Signal Strength Indicator (RSSI) value and a downstream RSSI value between the wireless client and a wireless access point associated with the wireless client when a time difference between obtaining the upstream RSSI value and the downstream RSSI value is less than or equal to a second threshold; and if a difference between the upstream RSSI value and the downstream RSSI value is less than or equal to a third threshold, then determining whether the wireless client is in a coverage hole based on the beacon report.

13. The method of claim 12 wherein the signal strength data is a RSSI histogram for the wireless client that corresponds to RSSI values obtained from the wireless client over a period of time.

14. The method of claim 13 wherein the signal strength data is a maximum RSSI histogram for the wireless client that corresponds to RSSI values obtained from the wireless client during a worst sub-period over the period of time.

15. The method of claim 12 wherein the beacon report further includes a first time stamp.

16. The method of claim 15 further comprising determining the time difference between obtaining the upstream RSSI value and the downstream RSSI value.

17. The method of claim 16 further comprising comparing the first time stamp included in the beacon report with a second time stamp provided by the wireless access point associated with the wireless client, wherein the second time stamp indicates a time that the wireless access point receives a probe request in connection with the beacon report from the wireless client.

18. The method of claim 12 wherein the wireless client is in a coverage hole if the beacon report indicates that there is no wireless access point with a sufficient signal strength available to the wireless client.

19. The method of claim 12 wherein the signal strength data comprises one or more of signal-to-noise ratio, signal-to-interference ratio, and signal-to-noise-plus-interference ratio.

20. The method of claim 12 further comprising determining whether a the coverage holes is a false positive.

21. The method of claim 12 further comprising locating multiple coverage holes for the wireless client.

22. The method of claim 12 wherein the beacon report improves accuracy in locating the one or more potential coverage holes.

23. A system for identifying coverage holes in a wireless network, the system comprising:

a wireless network infrastructure node operable to analyze signal strength data associated with a wireless client, and if the signal strength data indicates that communication quality with the wireless client falls below a first threshold, then     request a beacon report from the wireless client, wherein the beacon report includes one or more wireless access points discovered by the wireless client,     validate the beacon report by comparing a upstream Received Signal Strength Indicator (RSSI) value and a downstream RSSI value between the wireless client and a wireless access point associated with the wireless client when a time difference between obtaining the upstream RSSI value and the downstream RSSI value is less than or equal to a second threshold, and     if a difference between the upstream RSSI value and the downstream RSSI value is less than or equal to a third threshold, then determine whether the wireless client is in a coverage hole based on the beacon report, one or more wireless clients, each operable to provide a beacon report.

\* \* \* \* \*